No. 750,096. Patented January 19, 1904.

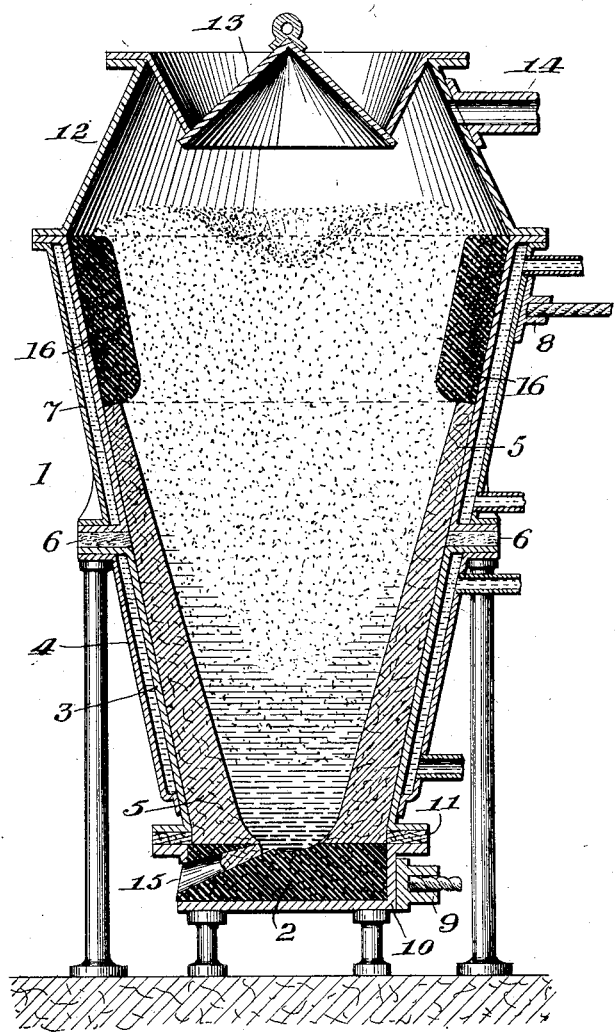

UNITED STATES PATENT OFFICE.

ALFRED H. COWLES, OF CLEVELAND, OHIO.

PROCESS OF EFFECTING CHEMICAL CHANGES.

SPECIFICATION forming part of Letters Patent No. 750,096, dated January 19, 1904.

Application filed November 5, 1902. Serial No. 130,192. (No model.)

*To all whom it may concern:*

Be it known that I, ALFRED H. COWLES, a citizen of the United States, residing at Cleveland, in the county of Cuyahoga and State of Ohio, have invented certain new and useful Improvements in Processes of Effecting Chemical Changes, of which the following is a specification.

This process of effecting chemical changes is especially directed to the production of carbids, such as calcium carbid, by passing an electric current through a body of carbid-forming materials acting as a resistance-conductor and increasing the current density along the path of the current to a point where the heat generated by the resistance of the body causes the materials to react to form carbid. The process is preferably carried out in a continuous manner by tapping off the molten product and supplying fresh material as required.

A suitable but not the only type of furnace for carrying out the process is shown in the accompanying drawing, in which the figure is a vertical axial section.

The furnace chosen for illustration is an annular stack having a body or shell 1, of iron, such as boiler-plate, and a hearth 2, of carbon. The iron shell comprises a lower downwardly-converging ring or bosh 3, which is surrounded by a water-jacket 4 and has a continuous lining 5, of refractory non-conducting material, which preferably is of the same composition as the material being reduced, extending down to the carbon hearth. Supported upon the bosh-ring 3, but separated therefrom by a layer 6, of refractory insulation, such as asbestos, is a downwardly-converging water-jacketed iron ring 7. The refractory lining 5 extends upwardly within the lower portion of ring 7, while a carbon lining 16, acting as one electrode, is arranged in contact with the upper portion of ring 7. To ring 7 is secured one terminal 8 of the source of electric current. The other terminal 9 is secured to an iron casing 10, which surrounds the carbon hearth. This hearth-casing 10 is separated from the bosh-ring 3 by a layer of refractory insulation 11. Supported upon body-ring 7 is an iron ring 12, which carries a bell-and-hopper charging mechanism 13. A flue 14 for waste gases opens from the upper part of ring 12. A tap-hole 15 for the molten product extends through the carbon hearth. Instead of the carbon lining 16 a number of separated stationary or movable electrodes may be used.

In carrying out the process to produce calcium carbid an initial charge consisting of lime or limestone and carbon is fed into the furnace. In some instances and to provide for good conductivity I may employ the well-known charge containing pieces of coke or hard carbon, which lie in contact with each other at various points, and thereby afford direct paths for the flow of current, the lime being distributed in the interstices between the pieces of carbon. An electric current of sufficient amperage is passed through the charge, and the portion where the current density is sufficient is brought to a temperature which causes the materials to react to form carbid and the carbid to be brought into a molten condition. The molten carbid is tapped out from time to time as it accumulates and fresh material fed into the furnace as required. The process is thus a continuous one. The waste gases passing up from the zone of reduction through the charge serve to preheat it, as well understood, and may be removed for heating or other purposes.

The lines of current-flow converge from the upper electrode to the lower one, giving a gradually-increasing current density through the charge toward the lower electrode. The corresponding heat generated by the passage of the current through the charge thus gradually increases downward to a region where a zone of reduction and fusion is maintained. The charge is thus gradually preheated before reduction not only by the waste gases, but also by the heat engendered by the passage of the current through the mass.

It is not essential that the charge should consist of a mixture which is a conductor at atmospheric temperatures. The process may be equally employed for the production of calcium carbid from a mixture of ground coke and lime. In this case, however, it is necessary to provide an initial conducting-path or to employ high voltage to start the operation. The charge will be preheated during the normal operation of the furnace by the waste gases and by conduction and radiation to a temperature which will enable it to act as a resistance-conductor before it descends into the path of current-flow.

The construction and arrangement of the furnace may be widely varied without rendering it incapable of use as a means for practicing the process claimed. The furnace shown and described is claimed in my copending application, Serial No. 132,134, filed November 20, 1902.

I claim—

1. The process of producing carbids, which consists in placing the terminals of a source of electric current in contact with different parts of a body of carbid-forming materials, passing an electric current between said terminals, and increasing the current density along the path of the current in the body to a point where the heat generated by the resistance of the body causes the materials to react to form carbid, as set forth.

2. The process of producing carbids, which consists in placing the terminals of a source of electric current in contact with different parts of a body of carbid-forming materials, passing an electric current between said terminals, and increasing the current density along the path of the current in the body to a point where the heat generated by the resistance of the body causes the materials to react to form carbid and the carbid to be brought into a molten condition, as set forth.

3. The process of producing carbids, which consists in placing the terminals of a source of electric current in contact with different parts of a body of carbid-forming materials, passing an electric current between said terminals, increasing the current density along the path of the current in the body to a point where the heat generated by the resistance of the body causes the materials to react to form carbid and the carbid to be brought into a molten state, and tapping off said molten carbid and supplying fresh material as required, as set forth.

4. The process of producing calcium carbid, which consists in placing the terminals of a source of electric current in contact with different parts of a mixture containing a calcium compound and carbon, passing an electric current between said terminals, and increasing the current density along the path of the current in the body to a point where the heat generated by the resistance of the body causes the materials to react to form carbid, as set forth.

5. The process of producing calcium carbid, which consists in placing the terminals of a source of electric current in contact with different parts of a mixture containing a calcium compound and carbon, passing an electric current between said terminals, and increasing the current density along the path of the current in the body to a point where the heat generated by the resistance of the body causes the materials to react to form carbid and the carbid to be brought into a molten condition, as set forth.

6. The process of producing calcium carbid, which consists in placing the terminals of a source of electric current in contact with different parts of a mixture containing a calcium compound and carbon, passing an electric current between said terminals, increasing the current density along the path of the current in the body to a point where the heat generated by the resistance of the body causes the materials to react to form carbid and the carbid to be brought into a molten state, and tapping off said molten carbid and supplying fresh material as required, as set forth.

7. The process of producing carbid, which consists in interposing a body of carbid-forming materials as a resistance-conductor in an electric circuit, passing through said body a current of sufficient volume to cause the materials to react to form carbid and the carbid to be brought into a molten condition, removing the molten carbid and supplying fresh materials as required, and moving the charge substantially along the path of current-flow, as set forth.

8. The process of producing carbids, which consists in interposing a body of carbid-forming materials as a resistance-conductor in an electric circuit, and increasing the current density in a portion of said body to a point where the heat generated by the resistance of the body causes the materials to react to form carbid, as set forth.

9. The process of producing carbids, which consists in interposing a body of carbid-forming materials as a resistance-conductor in an electric circuit, and increasing the current density in a portion of said body to a point where the heat generated by the resistance of the body causes the materials to react to form carbid and the carbid to be brought into a molten state, as set forth.

10. The process of producing carbids, which consists in interposing a body of carbid-forming materials as a resistance-conductor in an electric circuit, increasing the current density in a portion of said body to a point where the heat generated by the resistance of the body causes the materials to react to form carbid and the carbid to be brought into a molten state, and tapping off said molten carbid and supplying fresh material as required, as set forth.

11. The process of producing calcium carbid, which consists in interposing a mixture containing a calcium compound and carbon as a resistance-conductor in an electric current, and increasing the current density in a portion of said body to a point where the heat generated by the resistance of the body causes the materials to react to form carbid, as set forth.

12. The process of producing calcium carbid, which consists in interposing a mixture containing a calcium compound and carbon as a resistance-conductor in an electric circuit, and increasing the current density in a portion of said body to a point where the heat generated by the resistance of the body causes the materials to react to form carbid and the carbid to be brought into a molten state, as set forth.

13. The process of producing calcium carbid, which consists in interposing a mixture containing a calcium compound and carbon as a resistance-conductor in an electric circuit, increasing the current density in a portion of said body to a point where the heat generated by the resistance of the body causes the materials to react to form carbid and the carbid to be brought into a molten state, and tapping off said molten carbid and supplying fresh material as required, as set forth.

14. The process of producing carbids, which consists in placing the terminals of a source of electric current in contact with different parts of a body of carbid-forming materials, passing an electric current between said terminals, and increasing the energy density along the path of the current in the body to a point where the heat generated by the resistance of the body causes the materials to react to form carbid, as set forth.

15. The process of producing carbids, which consists in placing the terminals of a source of electric current in contact with different parts of a body of carbid-forming materials, passing an electric current between said terminals, increasing the energy density along the path of the current in the body to a point where the heat generated by the resistance of the body causes the materials to react to form carbid and the carbid to be brought into a molten state, and tapping off said molten carbid and supplying fresh material as required, as set forth.

16. The process of producing carbids, which consists in interposing a body of carbid-forming materials as a resistance-conductor in an electric circuit, and increasing the energy density in a portion of said body to a point where the heat generated by the resistance of the body causes the materials to react to form carbid, as set forth.

17. The process of producing calcium carbid, which consists in interposing a mixture containing a calcium compound and carbon as a resistance-conductor in an electric current, increasing the energy density in a portion of said body to a point where the heat generated by the resistance of the body causes the materials to react to form carbid and the carbid to be brought into a molten state, and tapping off said molten carbid and supplying fresh material as required, as set forth.

18. The process of producing carbids, which consists in placing the terminals of a source of electric current in contact with different parts of a body of carbid-forming materials, passing an electric current between said terminals, and causing the lines of current-flow from one terminal or set of terminals to converge to the other terminal and thereby increasing the energy and current density along the path of the current in the body to a point where the heat generated by the resistance of the body causes the materials to react to form carbid, as set forth.

19. The process of producing carbids, which consists in placing the terminals of a source of electric current in contact with different parts of a body of carbid-forming materials, passing an electric current between said terminals, causing the lines of current-flow from one terminal or set of terminals to converge to the other terminal and thereby increasing the energy and current density along the path of the current in the body to a point where the heat generated by the resistance of the body causes the materials to react to form carbid and the carbid to be brought into a molten state, and tapping off said molten carbid and supplying fresh material as required, as set forth.

In testimony whereof I affix my signature in presence of two witnesses.

ALFRED H. COWLES.

Witnesses:
F. W. POWER,
O. J. FRITH.